Figure 1:
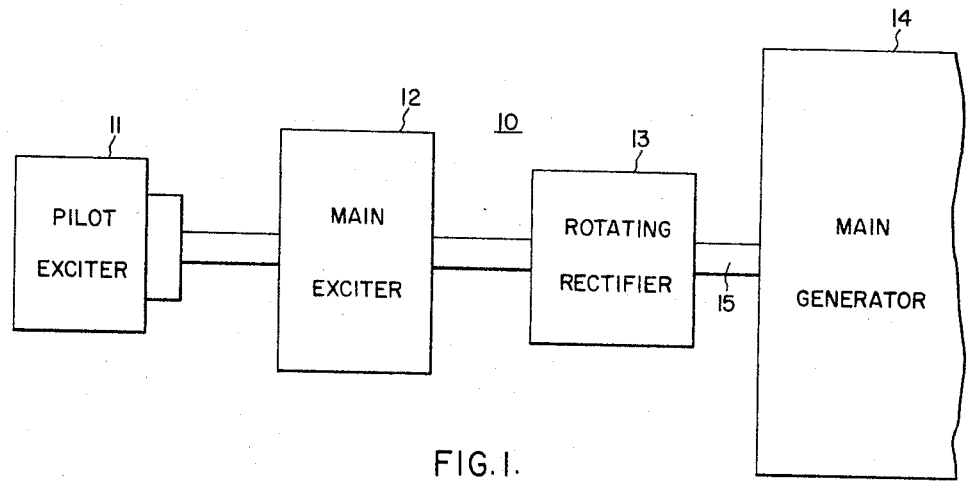

Nov. 1, 1966    R. J. KEADY    3,283,219
ROTATING RECTIFIER STRUCTURE WITH COOLING SUPPORT
THREADED INTO ROTATING RIM
Filed July 12, 1965    2 Sheets-Sheet 1

WITNESSES
Theodore F. Wrobel
Elroy Strickland

INVENTOR
Richard J. Keady
BY  F. V. Lyle
ATTORNEY

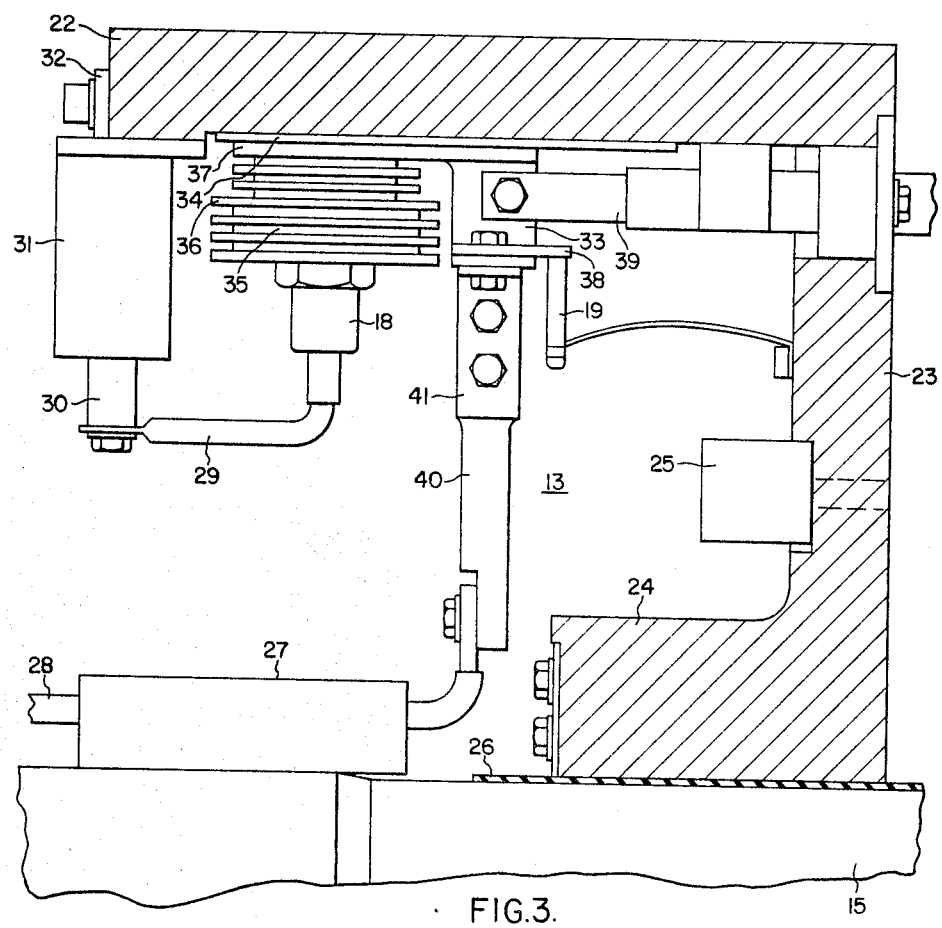
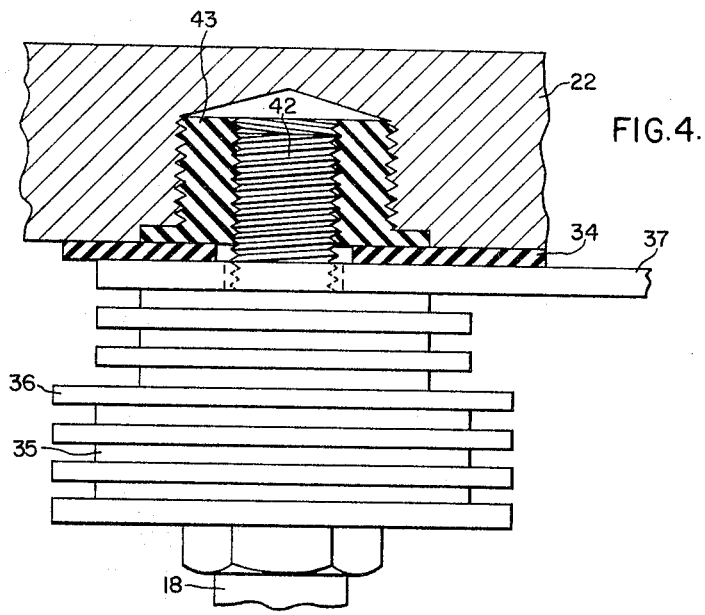
FIG.3.
FIG.4.

United States Patent Office 3,283,219
Patented Nov. 1, 1966

3,283,219
ROTATING RECTIFIER STRUCTURE WITH COOLING SUPPORT THREADED INTO ROTATING RIM
Richard J. Keady, Monroeville, Pa., assignor to Westinghouse Electric Corporation, Pittsburgh, Pa., a corporation of Pennsylvania
Filed July 12, 1965, Ser. No. 471,168
8 Claims. (Cl. 317—234)

My invention relates to rotating rectifiers, and in particular to a novel compact heat sink structure for use in excitation systems of synchronous alternating current machines of the brushless type. One such type of synchronous machine is the subject matter of U.S. Patent No. 2,972,711 issued February 21, 1961, to V. G. Sorokin et al. and is assigned to the same assignee as the present invention.

In general, such machines of the brushless type have a single alternating current exciter with means for rectifying the alternating current output for supplying direct current excitation to the field winding of a main machine. For this purpose, a rotating rectifier assembly is mounted on the same rotating member as the field of the main machine and the armature winding of the exciter.

Some brushless generator arrangements employ a pilot exciter and a main exciter such as described in copending application Serial No. 343,320, filed February 7, 1964, by Dillon B. Hoover and Bernard B. Winer, and assigned to the present assignee.

In such arrangements, a pilot exciter and regulator provide controlled field energization for an alternating current exciter, and the rotating armature of the exciter in turn produces an alternating voltage which is applied to a rotating rectifier physically disposed with the armature on a common shaft. The rectifier voltage is then applied to the main generator rotating field winding which is also disposed on the common shaft. Usually, the pilot exciter has a permanent magnet field and is also driven by the common shaft, but a separate motor generator set or any other suitable source can be used for pilot excitation. Efficiency and reliability are achieved through the elimination of maintenance and replacement problems normally associated with brushes, commutators and collection rings.

The rotating rectifiers usually comprises a plurality of semiconductor diodes mounted on one or more shaft supported component or diode wheels and electrically connected in a suitable excitation circuit between the exciter armature and the main generator rotating field winding. In some machines, fuses are provided in electrical series with respective diodes and the fuses can be disposed on one or more separate component wheels or they can be disposed with the diodes on one or more common component wheels. Similarly, capacitors and resistors may be employed for purposes of suppressing diode voltage spikes during commutation. These components can also be wheel mounted alone or in combination with the diodes and fuses.

A rotating rectifier construction for brushless turbine generators must be capable of withstanding the high centrifugal forces due to the high speed of rotation which is usually 3600 r.p.m. Further, semiconducting rectifier devices have limited safe operating temperature ranges thereby requiring a rectifier assembly construction capable of adequately cooling the rectifiers. The semiconductor rectifying devices themselves require an efficient heat sink to dissipate the losses inherent in operation in order to keep the devices within their safe operating temperature ranges. They also must be made readily accessible for replacement or repair.

At the present time, large elongated and rectangular shaped heat sinks are used to dissipate heat generated in the diodes. Fins are machined on exposed sides of the heat sinks and the heat sinks are bolted to a flange or rim portion of the rectifier wheel. The bolts must be insulated since the heat sink and flange portion are maintained at different potentials. A major portion of heat sink body structures presently in use is remote from the area of the heat source, namely, the rectifying diodes. That portion remote from the heat source is used primarily to provide space for electrical connections and for the bolts necessary for securing the heat sink to the rectifier wheel. A large portion of the heat sink is not efficiently used to dissipate heat. And since the heat sink and wheel are electrically insulated from each other along the entire length of the heat sink, extensive machining of the wheel and heat sink is required in order to provide necessary creepage distance between the insulated surfaces. The large heat sinks have the further disadvantage of adding unnecessary weight to the rectifying wheel as well as requiring a larger flange or rim area to support the heat sink. This in turn increases centrifugal forces and rotational windage losses.

It is, therefore, the object of the present invention to provide efficient diode heat dissipation in rotating rectifier assemblies with the use of minimum heat radiating bodies.

It is another object of this invention to provide a novel, compact heat sink for a rotating rectifier exciter that is inexpensive to manufacture, install and maintain.

It is yet another object of the present invention to provide an optimum diode heat sink arrangement in which centrifugal forces and windage losses are reduced to a minimum in rotating rectifier arrangements.

Figure 2:
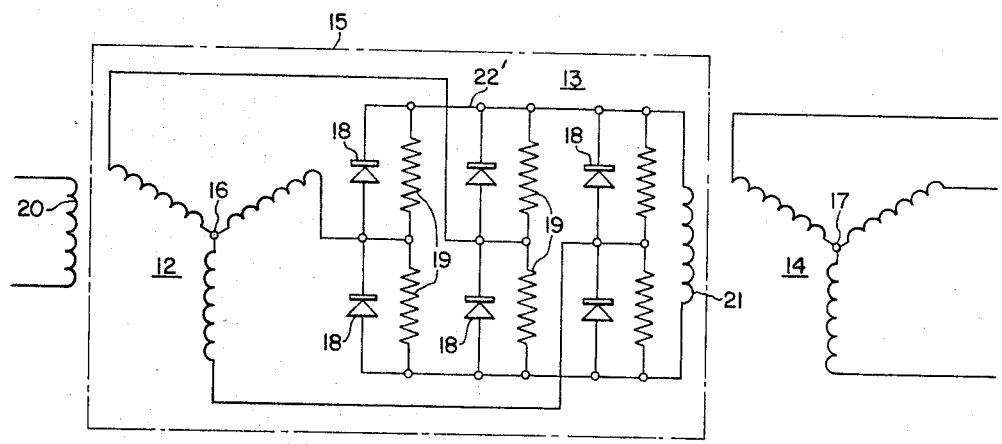

Other objects and advantages of the invention will be apparent from the following detailed description, taken in connection with the accompanying drawing, in which:

FIGURES 1 and 2 respectively show mechanical and electrical schematic diagrams of a brushless synchronous generating system in which a rotating rectifier is employed;

FIG. 3 shows a rotating rectifier portion of the system shown in FIG. 1 and constructed in accordance with the principles of the invention; and FIG. 4 shows an enlarged side view of the novel rotating rectifier heat sink shown in FIG. 3.

More particularly, there is shown in FIG. 1 an A.C. power generating system 10 in which there is employed a rotating rectifier 13 and a main A.C. exciter 12 which provides field energization for main generator 14 through rotating rectifier 13. Main exciter 12 receives its field energization from pilot exciter 11. Preferably, a mechanical common shaft 15 is provided for the power system 10, and when it is rotated by a suitable source of mechanical power, the power system 10 is electrically self-started and self-sustained for power generation by means of the pilot and main exciters 11 and 12. In the same manner, a machine using only a single exciter is electrically self-started and sustained.

In FIG. 2, alternating current exciter 12 has a three phase armature winding 16 which is carried on rotating shaft 15 and has a stationary field winding 20 excitable by any suitable external D.C. source such as the pilot exciter 11. Main generator 14 has a stationary three-phase armature winding 17 and a field winding 21 carried on rotating shaft 15 and adapted to be supplied with direct current excitation. The alternating current output of exciter 12 is rectified by rectifier assembly 13. Assembly 13, mounted integral with rotating shaft 15, connects three-phase armature winding 16 to field winding 21. In this manner, direct current excitation is supplied to field 21 of generator 14 without requiring a commutator or slip rings and without brushes.

As mentioned previously, the high speeds and centrifugal forces developed in turbo-generator applications require a rectifier assembly capable of withstanding such speeds and forces and having provisions for adequate cooling of the rectifier devices. FIGS. 3 and 4 show the preferred construction of rectifier assembly 13 in which a retaining member shown as an annular means 22 of rectifier wheel assembly 13 is utilized to support the semiconductor rectifying devices 18. Rectifiers 18 are preferably of the silicon type because of their high current carrying capacity.

Wheel assembly 13 comprises a hub portion 24, a radially extending wall or spider member 23 and an annular diode support rim or flange means 22. Annular means 22 can serve as a circumferentially spaced bus rim (corresponding to the interconnecting diode-resistor conductor 22' in FIG. 2) or its function can be limited to simply a diode-heat sink support means such as disclosed in the above cited patent. Similarly, for purposes of this invention, only a left-hand section of a rotating rectifying wheel is shown. It is understood that a double wheel arrangement could be used such as disclosed in copending application Serial No. 455,206, filed by Dillon B. Hoover on May 12, 1965 and assigned to the present assignee. In such an arragement, the wheel structure shown in FIG. 3 would have a substantially identical counterpart mounted on shaft 15 in a back-to-back relationship.

Wheel hub portion 24 is fitted about insulating tube 26 and is supported on shaft 15 by a suitable keying arrangement (not shown) with insulating tube 26 located therebetween.

Exciter connections to the rotating rectifier 13 are made by way of phase leads 28 which extend along shaft 15 and are suitably supported thereon. Phase leads 28 are supported within the wheel by support ring 27 which supports a plurality of leads 28 distributed about shaft 15. Each phase lead 28 is brought through support ring 27 and attached to a rigid conductor 40 by way of a bolt means. Conductor 40 is in turn connected to heat sink 35 by means of another connector coupling 41 which is suitably attached to heat sink 35 by a bolt means secured through a radial extension 33 of metal plate means 37 secured between heating sink 35 and rim insulation 34. Diodes 18 are in electrical contact with and secured to heat sink 35 in any suitable manner.

Alternating current is applied to each diode 18 by way of phase leads 28, radially extending connectors 40 and 41, metal plate means 37 and heat sinks 35. The direct current output from diodes 18 is taken to fuse holder terminals 30 by way of relatively flexible diode leads 29. Fuses 31 (only representatively shown) can be disposed about the circumference of flange or rim 22 and are attached or bolted in conductive relation to the edge surface thereof by means of fuse end plates 32. If fuses 31 are not used or are disposed on a separate wheel, leads 29 may be connected directly to annular means 22 or they may be returned to a hub portion of the wheel for electrical connection and physical support. In the arrangement shown in FIG. 3, member 22 acts as a bus that collects the total direct current produced by diodes 18 in rectifier wheel 13 and conducts the current to wheel section 23 and terminal 25 (only representatively shown) where it is collected for application to main generator field winding 21.

As previously mentioned, the heat sinks presently in use, are extensively machined and secured to annular support member 22 by way of bolts or dowels thereby necessitating a larger heat sink body than actually necessary for dissipating diode heat. In the present invention, a cylindrical heat sink 35 and heat dissipating fins 36 are easily cast or otherwise formed in a cylindrical shape and secured to member 22 by way of a threaded portion or nipple 42 as shown in FIG. 4. Since the sink 35 and wheel member 22 are utilized to carry different potentials, an insulating plate or pad 34 separates sink 35 and connector support members 33 and 37. Support members 33 and 38 function as a common connector for resistor 19, phase lead connector 41 and connector 39. Connector 39 is used to conduct the alternating current applied to wheel 13 to a corresponding wheel (not shown) and diode as mentioned above. In machines using only a single wheel, connector 39 (with its insulated extension) would not be necessary. The connector-support structure 33, is given by way of example only. Obviously, other means for electrically connecting and mechanically supporting the components coupled thereto may be made with design and structure requirements of different machines.

Heat sink 35 must further be insulated from wheel rim 22 by means of a suitable insulating insert 43 since a substantial portion of the heat sink is directly located within annular member 22, as shown in FIG. 4. Insert 43 has threads turned on its inner and outer diameters and is threaded into a tapped hole in wheel member 22. Insert 43 may be made of any thermally acceptable insulating material. The threaded portion or nipple 42 and insert 43 may be further secured into position by any suitable adhesive compound.

As can be readily seen, no securing bolts and insulating bolt jackets are necessary. Creepage distance is provided by a proper design of insulating pad 34 and insulating insert 43; little or no machining of the inside surface of wheel member 22 and heat sink 35 is required. With this arrangement sink 35 is easily assembled and disassembled for maintenance and repair. As can be seen from FIG. 3, the heat sink of this invention requires considerably smaller space thereby allowing for a decrease in the size of the rectifier wheel by shortening the wheel rim member 22. This, in turn, reduces the weight of the wheel in a very critical area, namely, the peripheral area of the wheel with consequent reduction of the centrifugal forces and windage losses that develop with the high speeds used in turbogenerator systems. The power rating of the system is, of course, not reduced with the reduction in size of the diode heat sink and wheel. This is all accomplished by the increased thermal efficiency of the novel diode heat sink arrangement as disclosed. Heat sink body 35 and fin structure 36 are located only in the immediate area of the heat source (diode 18) in the rectifier wheel.

While the invention has been shown and described with a certain degree of particularity, changes in detail and arrangement of parts may be made by those skilled in the art. For example, heat sink fins 36 may be easily turned as threads on cylindrical body 35 instead of being cast. Thus, the invention is not limited to the specific arrangement shown and described, but is intended to include all modifications which fall within the spirit and scope of the invention.

I claim as my invention:

1. In a rotating rectifier exciter, a rectifier wheel rim supporting a plurality of cylindrically shaped heat sinks on the interior surface thereof and electrically insulated therefrom, each of said heat sinks supporting at least one semiconducting diode in the center portion thereof, each of said heat sinks being secured to said rim by a threaded extension of the heat sink body threaded into an insulating insert located in said rim.

2. A rotating rectifier wheel assembly comprising a plurality of semiconducting diodes secured to a rim portion of the wheel on the inside surface thereof, each of said diodes secured to a heat sink and being separated from the rim by said heat sinks, each of said heat sinks having a threaded outside diameter, said rim portion of said wheel having tapped holes extending radially from the inside surface thereof and receiving the threaded diameter of said heat sinks.

3. In combination, an annular flange having a wall and hub portion adapted to be mounted on a rotating shaft, a plurality of spaced heat conductive bodies fastened to but electrically insulated from the interior surface of said flange and extending radially between said flange and said hub portion, a semiconductor rectifying device radially mounted on each of said bodies intermediate said flange and said hub portion and having one end in electrical and heat transfer relation therewith, each of said heat conductive bodies being secured to said flange by a threaded extension of the heat conductive body disposed in a tapped hole in said flange.

4. In combination, an annular flange having a spider frame and hub portion mounted on a rotating shaft, a plurality of heat sinks having a threaded portion threaded into but insulated from the interior surface of said flange and extending radially between said flange and hub portion, a semiconducting diode device radially mounted on each of said heat sinks intermediate said flange and hub portion, a pair of conductive connectors for each diode device circumferentially distributed within said frame, one of said connectors having one end connected to a terminal on said diode, the other of said connectors having an end secured to the heat sink and in electrical contact therewith.

5. The structure of claim 4 in which the connector connected to the diode has its other end secured to and in electrical contact with said flange.

6. The structure of claim 4 in which the other ends of the connector pair are secured to electrically conductive means circumferentially distributed around said rotating shaft and insulated therefrom.

7. The rotating rectifier exciter of claim 1 in which the insulated insert has threaeds turned on its inner and outer diameters.

8. The rotating rectifier exciter of claim 1 in which each semiconducting diode is electrically connected to the heat sink and to the rim of said rectifying wheel.

References Cited by the Examiner
UNITED STATES PATENTS

| | | | |
|---|---|---|---|
| 2,712,102 | 6/1955 | Bacon | 317—234 |
| 2,972,711 | 2/1961 | Sorokin et al. | 317—234 |
| 3,059,168 | 10/1962 | Sones et al. | 332—59 |
| 3,192,453 | 6/1965 | Pohm | 317—234 |

JOHN W. HUCKERT, *Primary Examiner.*

M. EDLOW, *Assistant Examiner.*